United States Patent
Baumeister et al.

(10) Patent No.: US 10,173,692 B2
(45) Date of Patent: Jan. 8, 2019

(54) MICROCONTROLLER SYSTEM AND METHOD FOR SAFETY-CRITICAL MOTOR VEHICLE SYSTEMS AND THE USE THEREOF

(71) Applicant: Continental Teves AG & Co. oHG, Frankfurt (DE)

(72) Inventors: Daniel Baumeister, Aschaffenburg (DE); Adrian Traskov, Steinbach (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 0 days.

(21) Appl. No.: 15/440,331

(22) Filed: Feb. 23, 2017

(65) Prior Publication Data
US 2017/0217443 A1    Aug. 3, 2017

Related U.S. Application Data

(63) Continuation of application No. PCT/EP2015/069342, filed on Aug. 24, 2015.

(51) Int. Cl.
*B60W 50/02*     (2012.01)
*G06F 11/07*     (2006.01)
(Continued)

(52) U.S. Cl.
CPC ...... *B60W 50/023* (2013.01); *B60W 50/0225* (2013.01); *G06F 11/0796* (2013.01); *G06F 11/2035* (2013.01); *G06F 11/2038* (2013.01)

(58) Field of Classification Search
CPC ........... B60W 50/023; B60W 50/0225; B60W 50/0205; B60T 2270/413; G05B 9/03; G05B 19/0421
See application file for complete search history.

(56) References Cited

U.S. PATENT DOCUMENTS 4,546,437 A    10/1985  Bleckmann et al.
4,665,522 A *   5/1987  Lala ................... G06F 11/1487
                                                714/797
(Continued)

FOREIGN PATENT DOCUMENTS

DE    3234637 C2    10/1990
DE    4137124 A1     5/1993
(Continued)

OTHER PUBLICATIONS

Reichenbach et al.; Multi-core Technology—Next Evolution Step in Safety Critical Systems for Industrial Applications; 13th Euromicro Conf. on Digital System Design: Architectures, Methods and Tools; Sep. 1-3, 2010; IEEE, (Year: 2010).*

(Continued)

*Primary Examiner* — Michael J Zanelli

(57) ABSTRACT

A microcontroller system for safety-critical motor vehicle systems is provided. The microcontroller system includes a plurality of subsystems arranged on a common chip. At least one of the subsystems has more than one channel and is designed to carry out a plurality of operating modes. The subsystems, in a first operating mode, are operated independently of each other and communicate with each other via an on-chip interface. In a second operating mode, at least one of the subsystems is operated by data transmission means and using non-local resources of at least one further subsystem and/or at least one of the subsystems is operating and at least one further subsystem is inactive. A method for operating such a microcontroller system and to the use thereof is also provided.

9 Claims, 1 Drawing Sheet

(51) Int. Cl.
*G06F 11/20* (2006.01)
*B60W 50/023* (2012.01)

(56) References Cited

U.S. PATENT DOCUMENTS

| | | | |
|---|---|---|---|
| 5,458,404 | A | 10/1995 | Fennel et al. |
| 6,201,997 | B1 | 3/2001 | Giers |
| 6,823,251 | B1 | 11/2004 | Giers |
| 2004/0060025 | A1* | 3/2004 | Kirschbaum ....... G06F 17/5045 716/119 |
| 2006/0161918 | A1 | 7/2006 | Giers |
| 2008/0258253 | A1 | 10/2008 | Fey et al. |
| 2008/0312790 | A1* | 12/2008 | Fey ............... B60R 21/0132 701/38 |
| 2009/0044048 | A1* | 2/2009 | Weiberle ............. G06F 9/30181 714/11 |
| 2013/0024721 | A1 | 1/2013 | Kabulepa et al. |
| 2016/0046265 | A1* | 2/2016 | Heise .................. G06F 9/544 701/70 |

FOREIGN PATENT DOCUMENTS

| | | |
|---|---|---|
| DE | 19529434 A1 | 2/1997 |
| DE | 19716197 A1 | 10/1998 |
| DE | 10124027 A1 | 11/2002 |
| EP | 1673667 B1 | 7/2009 |
| WO | 2008146091 A1 | 12/2008 |

OTHER PUBLICATIONS

ISR dated Jan. 11, 2016 of corresponding PCT application PCT/EP2015/069342.

DE search report dated May 20, 2015 of corresponding German patent application No. 10 2014 217 321.3.

Baleani, M. et al., Fault-Tolerant Platforms for Automotive Safety-Critical Applications, Proceedings of the 2003 internationals conference on Compilers, architecture and synthesis for embedded systems, p. 170-177.

* cited by examiner

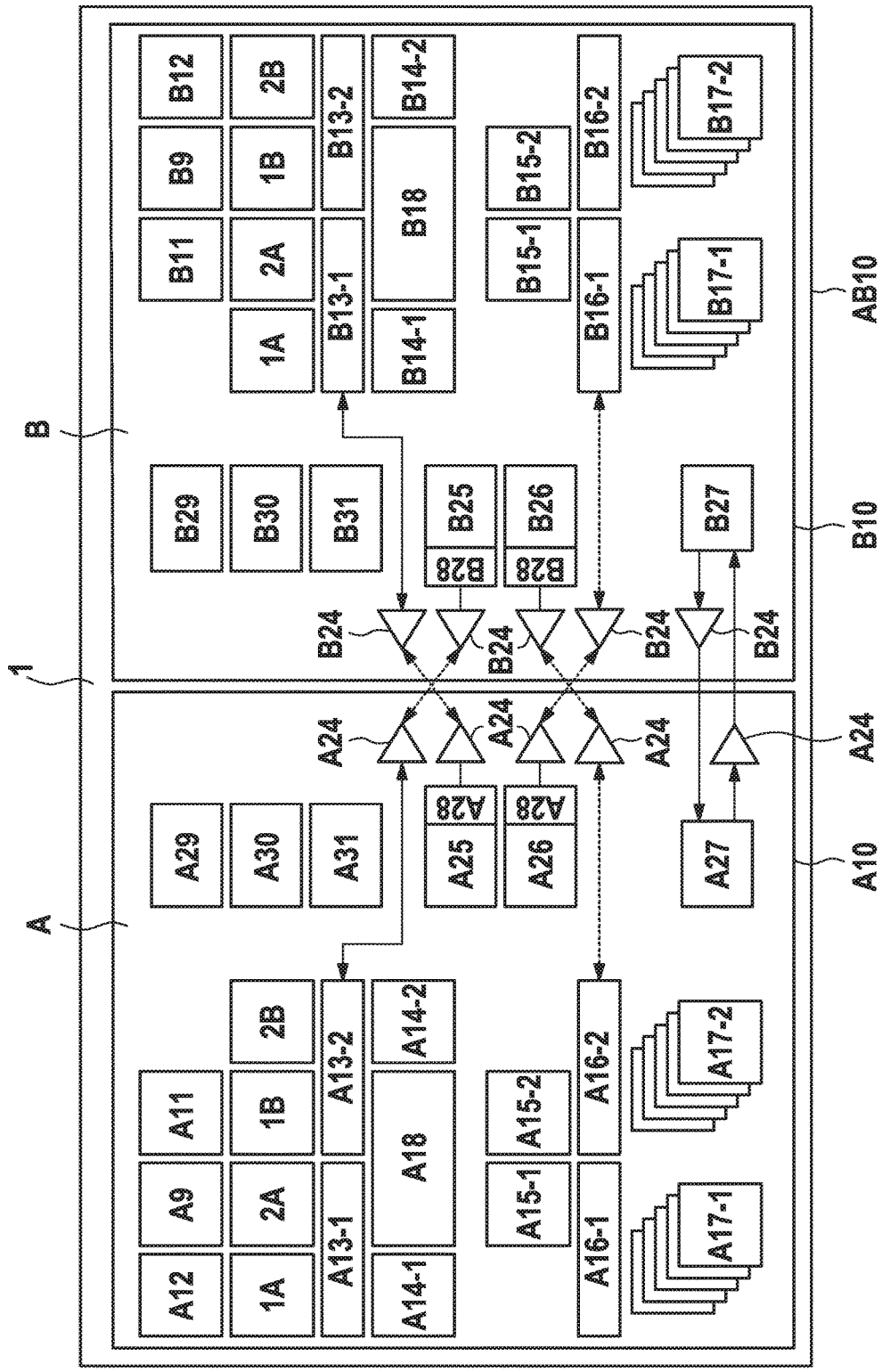

MICROCONTROLLER SYSTEM AND METHOD FOR SAFETY-CRITICAL MOTOR VEHICLE SYSTEMS AND THE USE THEREOF

CROSS-REFERENCE TO RELATED APPLICATIONS

This application claims the benefit of PCT Application PCT/EP2015/069342, filed Aug. 24, 2015, which claims priority to German Application DE 10 2014 217 321.3, filed Aug. 29, 2014. The disclosures of the above applications are incorporated herein by reference.

TECHNICAL FIELD

The disclosure relates to a microcontroller system for safety-critical motor vehicle systems, to a method for operating the microcontroller system, and to the use thereof.

BACKGROUND

Highly available or failsafe vehicle systems, such as are required for applications in automated driving, make increased demands of the availability and free interaction between electronic components of individual motor vehicle systems, and here specifically of a respective microcontroller which runs the underlying software of a vehicle system that is operated by the microcontroller. For these vehicle systems, the lowest possible failure probability is therefore correspondingly aimed at. An example of a high-availability or failsafe vehicle system is a brake system of a motor vehicle. Failure of such a system would imply a risk for road users, for which reason the functional capability of this system has to be continuously monitored in order to activate, for example, a fallback level when a fault occurs. Fault-tolerant redundancy concepts are significant to a particular degree for motor vehicle systems which have exclusively electronic fallback levels.

In order to increase the fail safety, it is known from DE 32 34 637 C2 to operate two processors having identical software, which can also be referred to as symmetrical redundancy. DE 41 37 124 A1 describes a microprocessor system with asymmetrical redundancy, where two processors are operated with different software.

A further system with core redundancy is described in DE 195 29 434 A1, in which two processor cores which operate synchronously are provided on one or more chips which contain the same input information and process the same program. The two processor cores are connected here to the read-only and random access memories as well as to input and output units via separate bus systems. The bus systems are connected to one another by driver stages or bypasses which permit the two processor cores to carry out common reading and processing of the available data, including the check data and commands. Only one of the two processor cores is connected (directly) to a fully fledged read-only and random access memory, while the memory capacity of the second processor core is limited to memory locations for check data (parity monitoring), in conjunction with a check data generator. Access to all the data is via the bypasses. As a result, the two processor cores are each capable of processing the entire program.

EP 1 673 667 B1 describes a microcontroller system with core redundancy for safety-critical applications, in which microcontroller system digital circuit components and analogue circuit components for actuating high-performance consumers are accommodated on a common chip or chip carrier and protected from one another by isolated regions.

Microcontrollers (MCU) which are known per se for safety-critical motor vehicle systems are, from the view of the programming model, a single core system, but frequently a plurality of processor cores are physically present in order to bring about parallel software implementation. Resources such as, for example, memory resources and/or peripheral resources, are, however, frequently not implemented multiple times and are shared by the processor cores. In contrast to this, multi-chip microcontrollers make available the entire resources multiple times. According to this description, a chip is understood to be an integrated circuit accommodated on a separate semiconductor substrate.

A significant disadvantage of the shared resources of multi-core microcontrollers is their susceptibility to fault such as e.g. random hardware faults, since the cores which share these resources are always affected. The independence of the multiple subsystems (cores) present is therefore only present for faults in the subsystems. The failure probability of a multi-core microcontroller is therefore determined essentially by faults in the shared resources and is, for example, of the order of magnitude of 40% of the overall failure rate.

Due to this multiple implementation, multi-chip systems are, however, more expensive compared to multi-core systems, which is the case, in particular, in respect of, by present day standards, large program and data memories with, for example, read-only memories greater than 4 MB, and main memories greater than 256 kB. The use of a plurality of chips for high-availability systems therefore constitutes a significant increase in the costs, to which, in particular, a larger number of integrated circuits and increased complexity of the underlying circuit carrier contribute.

Due to the large production numbers of integrated circuits, there is an enormous cost pressure on all the components. However, their functionalities which are designed, in particular, for safety are not restricted by cost-reducing measures.

SUMMARY

The disclosure provides a microcontroller system and a method thereof that makes available a means which permits an at least constantly high level of availability of microcontroller systems for safety-critical motor vehicle systems and at the same time can be implemented as cost-effectively as possible.

The disclosure describes a microcontroller system for safety-critical motor vehicle systems. The microcontroller system includes a plurality of subsystems, which are arranged on a common chip. At least one of the subsystems is of a multi-channel design. The microcontroller system is also distinguished by the fact that it is configured to carry out a plurality of operating modes, where in a first operating mode the subsystems are operated independently of one another and communicate with one another by means of a chip-internal interface, and in a second operating mode at least one of the subsystems is operated by means of provided data transmission means additionally using non-local resources of at least one of the further subsystems and/or at least one of the subsystems is operational and at least a further one of the subsystems is inactive.

The microcontroller system the method according to the disclosure advantageously achieve a reduction in the number of possible configurations of microcontroller systems for safety-critical motor vehicle systems and combine the configurations on a common chip with which at least constant availability can also be implemented. Against the background of rising costs for the production of masks of integrated circuits of modern semiconductor technology nodes—currently achieved minimum structure sizes of less than 40 nm—this represents a reduction in the one-off development costs and increases the overall number of these integrated circuits or microcontroller systems, since they can be used in a very wide variety of systems. Due to these advantages, considerable reductions in the manufacturing costs are possible.

A subsystem according to the disclosure may be a microcontroller which does not necessarily have to be accommodated on a separate chip, or, in other words, a computer system which is configured to operate modern motor vehicle systems. A subsystem may include not only digital but also preferably analogue circuit parts. Multi-channel systems have, in a manner known per se, at least two separate channels as a result of which the troubleshooting is increased and the availability of an underlying system improved. In this context, for example redundant and, if appropriate, diverse hardware configuration and/or software configuration, e.g. a plurality of processors with differently programmed algorithms, are known, where the respective results are compared. As a result, in the event of faults, safety-critical situations may be avoided.

The term inactive is preferably understood within the sense of the disclosure to be an operating state in which a subsystem does not perform any independent execution of a program. This is, in particular, a quiescent state or a deactivated state in which no I/O communication takes place. Therefore, requirements in terms of lower energy consumption by the microcontroller system may advantageously be met.

In some implementations, the subsystems have separate voltage supplies and/or system clock supplies which are respectively assigned thereto. As a result, the independence of the subsystems and fail-safety of the microcontroller system are advantageously increased.

In some examples, the additionally used non-local resources are memory resources and/or peripheral resources of the at least one further subsystem, where these resources are integrated into an address region of the at least one subsystem which additionally uses the non-local resources. An advantage is that the subsystem which additionally uses the non-local resources can therefore access the non-local resources in a comparable fashion to the local resources, and therefore an expanded range of use, in particular on the basis of brief adaptation to utilization requirements or continuously, is possible.

In some implementations of the microcontroller system, the subsystems are isolated from one another by means of electrical barriers. Electrical crosstalk may therefore be advantageously avoided by means of the common chip.

The subsystems may have different system clock domains, where during communication with the non-local resources one subsystem is synchronized with another by means of synchronization units.

The disclosure also describes a method for operating a microcontroller system for safety-critical motor vehicle systems, where the microcontroller system has a plurality of subsystems that are arranged on a common chip, and at least one of the subsystems is operated in a multi-channel fashion. The subsystems are operated independently of one another in a first operating mode, and communicate with one another by means of a chip-internal interface, and in a second operating mode at least one of the subsystems is operated additionally using non-local resources of at least one of the further subsystems, and/or at least one of the subsystems is operational and at least a further one of the subsystems is inactive.

For the method, the same advantages arise as have already been indicated for the microcontroller system according to the disclosure.

In some examples, the subsystems are operated by means of separate voltage supplies and/or system clock supplies which are respectively assigned thereto.

In order to additionally use the non-local resources of one of the further subsystems, the resources are integrated into an address region of the at least one subsystem which additionally uses the non-local resources.

Different access times to the non-local resources of at least one of the further subsystems are preferably taken into account in software partitioning, in particular of the subsystem which additionally uses the non-local resources.

The disclosure also relates to the use of the microcontroller system according to the disclosure and/or of the method according to the disclosure in a safety-critical motor vehicle system, in particular a motor vehicle brake system.

DESCRIPTION OF DRAWINGS

FIG. 1 shows an exemplary microcontroller system.

In FIG. 1 and the associated description, details are only given to components which are essential to understanding the disclosure.

Like reference symbols in the various drawings indicate like elements.

DETAILED DESCRIPTION

FIG. 1 shows an exemplary microcontroller system according to the disclosure which is implemented as a combination of a multi-core system and a multi-chip system on a single chip or silicon substrate. The latter includes in this context subsystem A and subsystem B which can each be implemented as a single-core system or multi-core system and which are physically separated, apart from the coupling due to the common silicon substrate, and have separate voltage supplies A11, B11 and system clock supplies A12, B12. To improve the functional safety, the two subsystems A and B implement, for example, two-channel safety architectures with redundant cores 1A, 2A and 1B, 2B as well as memory buses, A13-1, A13-2, B13-1, B13-2, RAM memories A14-1, A14-2, B14-1, B14-2 and comparator units A15-1, A15-2, B15-1, B15-2. Furthermore, each of the subsystems A and B includes at least one debug module A9, B9, at least one non-volatile memory A18, B18, peripheral interfaces A17-1, A17-2, B17-1, B17-2 and peripheral buses A16-1, A16-2, B16-1, B16-2 for connecting the peripheral interfaces A17-1, A17-2, B17-1, B17-2.

In the physical implementation (positioning and routing), the subsystems A and B are designed as if they were stand-alone circuits. The subsystems A and B are respectively and additionally surrounded jointly by electrical barriers A10, B10, AB10 which, in particular, are embodied with high impedance compared to the surrounding substrate and serve as means for providing isolation with respect to disruption such as, for example, overvoltage, electrostatic voltages (ESD) and/or overloading. Disruption which occurs in one of the subsystems is therefore locally limited and cannot propagate to the other subsystem or from disruption of other functional assemblies (not illustrated) on the chip 1 onto the subsystems A, B. In some examples, in the region between the subsystems A and B, it is also possible to have one barrier instead of the two separate barriers A10, B10. Electrical leads, which implement a communication between the subsystems A, B, are routed away via the barriers A10, B10 and beyond, where in order to avoid restrictions with respect to safety, which can arise with these leads, the buffers A24, B24 and/or ESD protective structures are provided. Signals which serve as subsystems for performing communication with other components on chip 1 can also be routed via such chip-internal drivers as is implemented, for example, for the chip-internal interface A27, B27 and buffers A24, B24 described further below.

In some implementations, three different operating modes of microcontroller systems are provided. The first operating mode implements multi-chip operation, where the two subsystems A and B which are independent of one another are activated and communicate with one another via the dedicated, chip-internal interface A27, B27. In order to monitor the subsystems A and B, in particular in this first operating mode, each of the subsystems has a multi-chip monitoring device A29, B29 ("watchdog").

A multi-core operation using non-local memory resources and peripheral resources occurs according to the second operating mode, where a subsystem, e.g., A, accesses memory resources A14-1, A14-2, A18, B14-1, B14-2, B18 and/or peripheral resources A16-1, A16-2, B16-1, B16-2 of the other subsystem, e.g., B. In some examples, the access occurs via the respective memory buses A13-1, A13-2, B13-1, B13-2 and peripheral buses A16-1, A16-2, B16-1, B16-2 of the subsystem B. In memory access operations, memories with double access can also alternatively be provided, for example. The subsystem from which resources are made available (according to this exemplary subsystem B), can then implement software itself—merely without using the exposed resources—or be inactive.

In the case of disruption in a subsystem, there is therefore no reaction on the other. The memory-expansion units A25 and B25 serve in the second operating mode to make available additional memory resources of the subsystem B to the subsystem A, and therefore expand the local memories A14-1, A14-2, A18 of the subsystem A with parts of or with the entire memory resources B14-1, B14-2, B18 of subsystem B. Due to the relatively large physical lead length to these additional memory modules, there is a relatively slow access time compared to the local memories. This fact is taken into account in the software partitioning (differentiation of small/large memory access latency time).

The peripheral expansion units A26 and B26 serve in the second operating mode to make available additional peripheral resources of the subsystem B to the subsystem A, and therefore to expand the scope of peripheral interfaces. Due to the relatively large physical lead length to these additional peripheral modules, the access time is slowed down compared to locally available peripheral resources. The peripheral expansion units A26 of the subsystem A integrate the respective peripheral interfaces A17-1, A17-2 into the address region of the subsystem A here, with the result that the latter can be operated like local peripheral interfaces in terms of software. The second operating mode also includes here the inverse case, specifically that the subsystem B accesses memory resources and/or peripheral resources of subsystem A.

Since the subsystems A, B use independent system clock supply devices A12, B12—at which different system clock domains are therefore present at the subsystems A and B—corresponding synchronization of these signals must be carried out, in particular, in the second operating mode at the changeover from one subsystem to the other ("clock domain crossing"). For this purpose, the synchronization units A28, B28 are provided in the communication paths of the memory units A25, B25 and peripheral expansion units A26, B26.

The third operating mode represents a multi-core operation in which, for example, only subsystem A is activated, at the same time using local memory resources and peripheral resources, that is to say resources which are arranged on the subsystem A. According to this mode, subsystem B is in a state of rest or is deactivated.

Furthermore, each subsystem A, B includes a device A30, B30 for monitoring the energy supply or voltage supply thereof, where in the case of a deviation from a setpoint value which is greater than one or more predefined limiting values, the respective subsystem is changed to a safe state. Each of the subsystems A and B additionally include a device A31, B31 for monitoring the system clock, where in the event of a deviation from a reference value that is greater than one or more predefined limiting values, the respective subsystem is also changed to a safe state.

A number of implementations have been described. Nevertheless, it will be understood that various modifications may be made without departing from the spirit and scope of the disclosure. Accordingly, other implementations are within the scope of the following claims.

What is claimed is:

1. A microcontroller system for safety-critical motor vehicle systems, the microcontroller system comprising:
    a common chip;
    first and second subsystems arranged on the common chip, the first or second subsystem includes a multi-channel design, each subsystem includes:
    a chip-internal interface; and
    local resources;
    wherein in a first operating mode of the microcontroller, the first and second subsystems are operated independently of one another and communicate with one another by way of the chip-internal interface, and
    wherein in a second operating mode of the microcontroller, the first subsystem transmits data to the second subsystem for using non-local resources indicative of the local resources of the second subsystem, the first subsystem is operational and the second subsystem cannot use the local resources associated with second subsystem.

2. The microcontroller system of claim 1, wherein the first and second subsystems have separate voltage supplies and separate system clock supplies which are respectively assigned thereto.

3. The microcontroller system of claim 1, wherein the additionally used non-local resources are memory resources and/or peripheral resources of the at least one further subsystem, wherein the memory resources and the peripheral resources are integrated into an address region of the first subsystem which additionally uses the memory resources and the peripheral non-local resources.

4. The microcontroller system of claim 1, wherein the first and second subsystems are isolated from one another by electrical barriers.

5. The microcontroller system of claim 1, wherein the first and second subsystems have different system clock domains, wherein during communication with the non-local resources in the second operating mode, one subsystem is synchronized with another using synchronization units.

6. A method for operating a microcontroller system for safety-critical motor vehicle systems, the method comprising:
- providing a common chip;
- providing a plurality of subsystems arranged on the common chip, wherein at least one of the subsystems is operated in a multi-channel fashion;
- in a first operating mode, operating the subsystems independently of one another, wherein the subsystems communicate with one another by a chip-internal interface; and
- in a second operating mode, operating at least one of the subsystems additionally using non-local resources of at least a different one of the subsystems, and at least one of the subsystems is operational and at least the different one of the subsystems cannot use the non-local resources of at least the different one of the subsystems.

7. The method of claim 6, further comprising operating the subsystems by separate voltage supplies and system clock supplies which are respectively assigned thereto.

8. The method of claim 6, wherein in order to additionally use the non-local resources of at least the different one of the subsystems, the non-local resources are integrated into an address region of the at least one of the subsystems which additionally uses the non-local resources.

9. The method of claim 6, wherein different access times to the non-local resources of at least the different one of the subsystems are taken into account in software partitioning.

* * * * *